A. DE VILBISS, Jr.
SCALE.
APPLICATION FILED APR. 14, 1905.
1,005,942.
Patented Oct. 17, 1911.
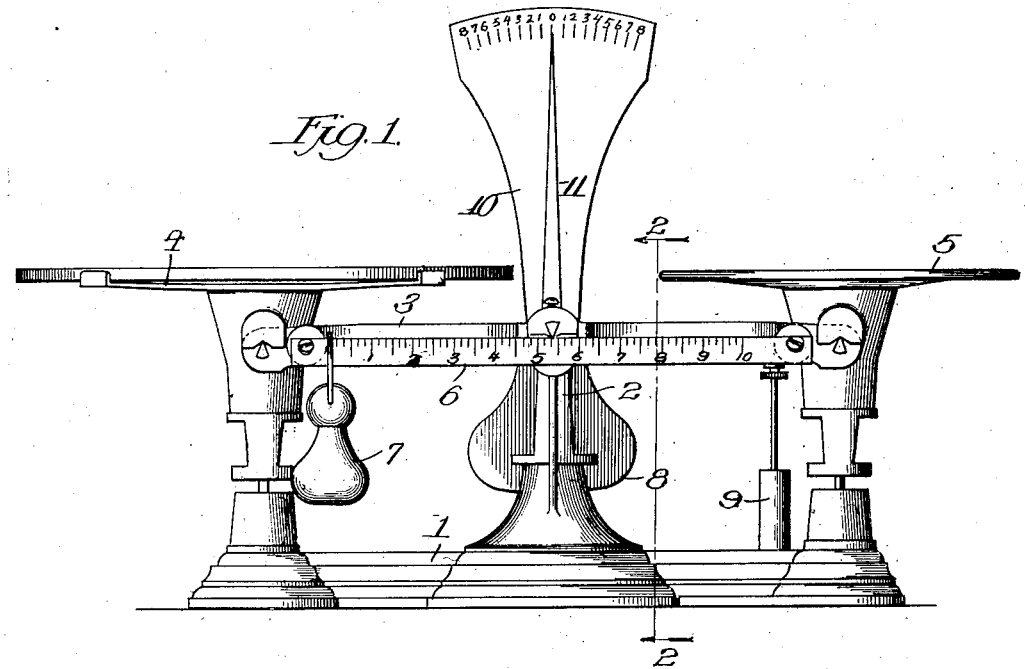
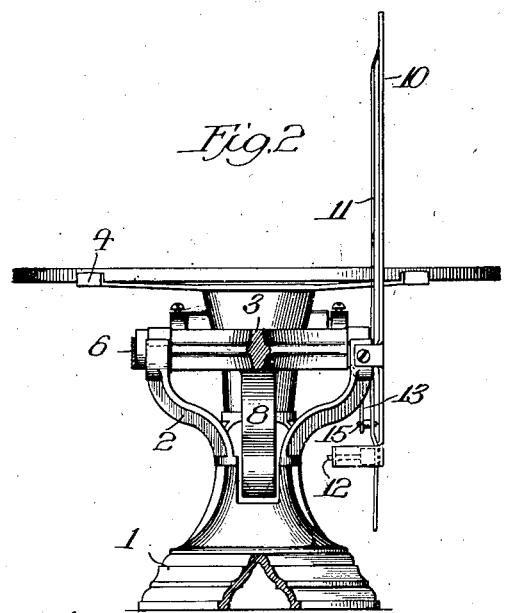
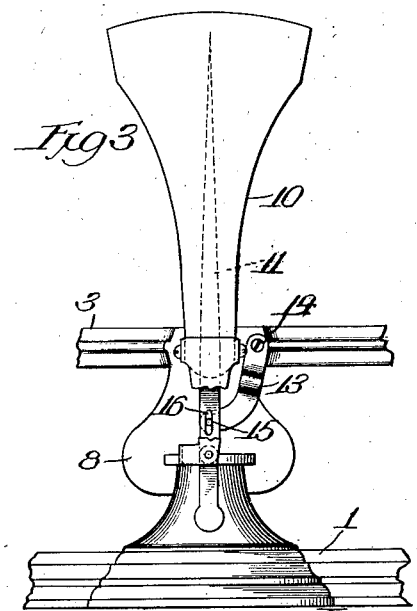
Witnesses
Edw. R. Barrett
Louis B. Erwin
Inventor
Allen De Vilbiss Jr.
By Rector & Hibben
his Atty

UNITED STATES PATENT OFFICE.

ALLEN DE VILBISS, JR., OF TOLEDO, OHIO, ASSIGNOR TO TOLEDO COMPUTING SCALE COMPANY, OF TOLEDO, OHIO, A CORPORATION OF NEW JERSEY.

SCALE.

1,005,942.　　　　Specification of Letters Patent.　Patented Oct. 17, 1911.

Application filed April 14, 1905. Serial No. 255,650.

*To all whom it may concern:*

Be it known that I, ALLEN DE VILBISS, Jr., a citizen of the United States, residing at Toledo, Lucas county, Ohio, have invented certain new and useful Improvements in Scales, of which the following is a specification.

My invention relates to certain improvements in scales, more particularly, though not necessarily, to that type of scale known as an even balance scale and for the sake of a clear and definite description, my invention is illustrated and described in connection with a scale of this particular type, although it will be understood that my invention may be applied to other types of scales of the same general character. I therefore contemplate using my invention wherever applicable.

In general terms, the object of my invention is to provide means under the control of the scale lever for indicating either or both underweight and overweight, that is under or over weight, as compared with the weight which coöperates with a poise beam, whereby such weight or poise may be employed in lieu of the usual movable weights placed on the weight platform and said indicating means may be employed for the fractional amounts of a pound or other unit of weight, such indicating means in its preferred form being also employed as a "near-weight" detector, for the purpose of indicating to the salesman that the load or article of merchandise on the load platform is "near-weight".

My invention comprises other novel and advantageous features of construction and operation which will be apparent from the description hereinafter given.

In the accompanying drawing Figure 1 is a front elevation of an even balance scale embodying my invention; Fig. 2 a sectional elevation on the line 2—2 of Fig. 1, and Fig. 3 a rear elevation of the middle portion of the scale.

Referring to the particular form of scale and the particular embodiment of my invention as herein illustrated, such scale comprises a base 1 having uprights or standards 2 rising from the central portion thereof, upon whose upper ends is pivoted or fulcrumed, on suitable bearings, the scale lever 3. In the present instance, the outer ends of the scale lever are pivotally connected to the merchandise or load platform 4 and to the weight platform 5 respectively. As is usual in scales of the type now being described, the downward extensions of the platforms are connected with parallelogram arrangements which are so well known as not to require any description. The scale lever is also provided with a poise beam 6, suitably graduated and, as shown, indicating pounds—10 pounds in the present instance—and adapted, in the preferred employment of my scale, to weigh the pounds of the load or article of merchandise but not the fractions thereof, which latter weighing is done by separate mechanism hereinafter described. A weight or poise 7 coöperates with the poise beam and is adapted to be moved therealong so as to weigh up different amounts. As stated, the capacity of the poise beam is 10 pounds in the present instance, but as will be obvious, the capacity of the scale may be increased by placing weights upon the weight platform 5. In the present modification of the even-balance scale now being described, this is the only function which is performed by the weight platform 5, but in the event that 10 pounds is a sufficient capacity for practical purposes, such weight platform may be dispensed with altogether. The scale is further provided with a weight 8 secured to or forming a part of the scale lever and arranged at the middle portion thereof and provided for the purpose of weighting the scale lever or giving gravity thereto, as it is designated in scale parlance. The scale lever is furthermore provided with means for cushioning its movements and to this end I operatively connect such scale lever with a dash-pot 9 secured to the base of the scale, as indicated in Fig. 1. This dash-pot is desirable and advantageous not only when the scale is employed as hereinafter described, but also when used as an ordinary even-balance scale, for one of the objections to such form of scale is that when the load or article being weighed is suddenly removed from the load platform as is the case in actual use, the weight platform is suddenly depressed with considerable shock, which objection is altogether avoided by the employment of my dash-pot.

Upon one of the standards 2—in the present instance the rear standard—is secured an upright or vertical plate 10, provided near its upper end and on its front face with a series of graduations, such plate constituting the chart which, in the present instance, is employed not only as a "near-weight" detector, but also as a means for weighing the fractional parts of a pound, to which end the graduations represent ounces as herein shown. A pointer or indicator 11 vertically arranged is adapted to coöperate with this chart and in the movements of the scale lever is adapted to move or sweep over the face of such chart, to which end such pointer is operatively connected with the poise beam. In the present instance and as shown in the drawings, the lower end of the plate 10 is extended so as to form a frame or bearing for a transverse pin 12, Fig. 2. The pointer or indicator is pivoted near its lower end upon said pin 12, such pointer being extended as indicated in Figs. 2 and 3, for the purpose of counterbalancing the same. For the purpose of moving or shifting the pointer or indicator in unison with the scale lever, I provide suitable connections between such parts, the operating connection in the present instance consisting of an arm 13 secured at its upper end at 14 to the scale lever at one side of its pivotal point. The lower end of this operating arm has a pin and slot connection with the pointer or indicator and to this end, as herein shown, such arm is provided with a pin 15 received by a vertical or longitudinal slot 16 in the pointer or indicator. It is evident from the foregoing description that the rocking movements of the scale lever are communicated to the indicator or pointer which when the scale lever is in balanced position indicates zero on the chart.

In practice, the scale is operated as follows: Assuming for example that a customer calls for 10 pounds and 3 ounces of an article, the weight or poise 7 is moved to the right (Fig. 1) to the indication "10" representing 10 pounds which in the present instance is the capacity of the poise beam 6. The salesman thereupon keeps placing or pouring the article upon the platform 4 until the pointer or indicator 11 which has been moved to the left-hand side of the chart by the weight or poise 7, begins to move, thus indicating to the salesman that the article is getting "near-weight," and cautioning the salesman to pour more slowly. When the pointer indicates zero on the chart, there is exactly 10 pounds of the article on the platform 4 and in order to get the fractional amount, the salesman, continuing the pouring very slowly, watches such indicator until it points to the indication "3" which means 3 ounces. There is now exactly, under the example assumed, 10 pounds and 3 ounces of the article on the platform 4. When such load or weighed article is removed from this platform the scale lever does not move with a shock as usual in the ordinary even-balance scale, but such movement is properly retarded by the dash-pot 9. Under this assumed example, the weight platform 5 plays no part whatsoever and may be dispensed with altogether where the amounts being weighed do not exceed the capacity of the poise beam 6 and the indications on the chart.

By the use of my invention I thus provide a "near-weight" detector and also dispense with the usual movable weights, ordinarily used on the platform 5. The advantage of the "near-weight" device resides in the fact that the salesman is informed that while pouring the article he is getting "near-weight" so that there is no danger of pouring over-weight, requiring a dipping out with a scoop or the like of such over-weight and continuing the pouring operation until the exact amount is placed on the platform 4. The advantage of dispensing with the usual movable weights for the platform 5 is obvious when it is considered that the weight or poise 7 performs practically all the functions of the numerous weights which are required in scales of this general character. Heretofore, in the even-balance type of scale the poise beam 6 has been employed for the fractional amounts, while the amounts in pounds have been provided for by the weights placed on the weight platform 5.

It will be understood that in case the amount to be weighed is a number of pounds within the capacity of the poise beam 6, the weight or poise 7 will be moved to that number and the salesman will watch the pointer until it will indicate zero but he will of course be notified in advance of the fact that he is getting "near-weight." In this particular instance, however, the pointer or indicator is employed as a "near-weight" detector and also to indicate that the poise beam is in balanced condition and the same is of course employed to indicate fractional amounts of a pound. Furthermore, it will be understood that in case the amounts to be weighed are in excess of the capacity of the poise beam 6, a sufficient weight or a number of weights may be placed on the weight platform 5, so as to bring the scale up to the desired capacity.

I claim:

1. In an even-balance scale, the combination of a scale beam having a load platform on one end and a weight platform on the other, a centrally located upright dial, a pointer extending upwardly over said dial, said pointer pivoted below the beam in vertical alinement with the latter's fulcrum, and an arm secured to the beam to one side of said fulcrum and engaged with the pointer below the fulcrum.

2. In a scale, the combination of a scale lever having a poise beam and a weight or poise coöperating therewith, a pointer or indicator for weighing or indicating under and over weight, and operating connections between the pointer and scale lever comprising an arm connected with such lever and having pin and slot connection directly with the pointer; substantially as described.

3. In an even-balance scale, the combination of a scale beam having a load platform on one end and a weight platform on the other, a centrally located upright dial, a pointer extending upwardly over said dial, said pointer pivoted below the beam in vertical alinement with the latter's fulcrum, and an arm secured to the beam to one side of said fulcrum and having a slot and pin connection with the pointer.

4. In a scale, the combination of a beam centrally fulcrumed and having a load-receiver on one end and a weight receiver on the other, a pendulous weight hung from the central portion of the beam, a dial, a pointer extending over the latter, a pin-and-slot connection between the beam and the pointer, a graduated poise beam carried by the main beam, and a poise weight on said poise beam.

ALLEN DE VILBISS, Jr.

Witnesses:
S. E. HIBBEN,
LOUIS B. ERWIN.